United States Patent [19]

McDonald

[11] 4,005,420
[45] Jan. 25, 1977

[54] CW RADAR SYSTEM

[75] Inventor: Thomas Wayne McDonald, Dana Point, Calif.

[73] Assignee: Esterline Electronics Corporation, Costa Mesa, Calif.

[22] Filed: Mar. 12, 1975

[21] Appl. No.: 557,479

[52] U.S. Cl. ............................. 343/7.5; 343/12 MD
[51] Int. Cl.² ............................................ G01S 9/39
[58] Field of Search ..................... 343/12 MD, 7.5

[56] References Cited

UNITED STATES PATENTS

| | | | |
|---|---|---|---|
| 3,216,010 | 11/1965 | Roeschke | 343/7.5 |
| 3,246,322 | 4/1966 | Kuecken | 343/7.5 X |
| 3,289,204 | 11/1966 | Murray et al. | 343/12 MD |
| 3,611,370 | 10/1971 | Frasure et al. | 343/7.5 |
| 3,868,686 | 2/1975 | Magorian | 343/7.5 X |

*Primary Examiner*—Malcolm F. Hubler
*Attorney, Agent, or Firm*—Harvey C. Nienow

[57] ABSTRACT

A self telemetering miss-distance radar method and system of high sensitivity and free of second-time-around echoes is provided by phase modulating a continuous wave signal with the output of a repetitive code source such as a pseudo-random noise generator. That signal is transmitted as the radar signal. Returning echoes are applied to one input of a product detector to whose other input a sample of the unmodulated CW signal may be applied. The mixer output contains the product of the CW signal and the echo. The echo includes the CW signal modified to include the noise code and Doppler shift. That product signal is applied to a second product detector to which a delayed version of the noise code is applied. If the code in the echo arrives at the second product detector in unison with the delayed code, the output level will be high. If not, it will be low. The second detector output, the second product signal, is passed through a Doppler filter. If there was unison in the codes, the Doppler signal output will be large. In some applications, the first product detector may be omitted.

Doppler filter output can be used to frequency modulate the CW oscillator to develop a telemetering signal, or it can be used to generate digital signals which are added to the pseudo-random noise code generator output. In either event, the radar signal is modulated with current miss-distance information so that it serves as a telemetering signal for application to a separate antenna or to the radar antenna.

9 Claims, 4 Drawing Figures

N = bits in code
b = bit period

CW RADAR SYSTEM

This invention relates to improvements in continuous wave radar systems, and it relates in particular to a radar system whose function is to determine the distance with which projectiles pass by a target.

The pilots of military fighter aircraft practice attack and gunnery techniques by having them attack and shoot at drone aircraft or towed targets. In addition to such air-to-air systems, the invention is applicable to air-to-ground and ground-to-air gunnery practice systems. For such training systems to be effective, it is necessary that some means by provided for knowing how close the projectiles fired from the fighter aircraft or ground based firing site have passed by the target. It is common to fit the target with a radar set which transmits ultra-high frequency radio signals and receives echoes of those signals when they are returned from passing projectiles. That application for radar systems presents special problems as a consequence of which such systems are often called "miss-distance indicators" or "scoring systems".

Miss-distance indicators tend to become damaged in use and are likely to be short lived. As a consequence, one of the design objectives is to reduce cost to an absolute minimum. Another objective, almost equally compelling, is to minimize the weight of the radar set. On the other hand, there is no point in providing such a system unless it can detect miss-distances with a substantial degree of accuracy, and unless the miss-distance information can be reliably and inexpensively transmitted to some telemetry station.

The projectile is small and its distance from the target may be very small. In practice, the requirement may be to detect a small bullet passing the target at distances of five feet or less. Further, the system must be able to distinguish between echoes that are returned from passing projectiles and echoes that are returned from the target.

In creating a bullet scorer radar, or miss-distance indicator, one has a variety of techniques and apparatus from which to make selection. Continuous wave systems have been used, but the problems of anamolous indication, high leakage from transmitting to receiving antennaes, and a host of others, prompted development of a number of pulse radar systems. Such systems present another set of problems, not the least of which is complexity with its attendant loss of reliability and increase in cost. An object of this invention is to provide a simple system which is substantially free from anamolous indications. In this connection, it is an object to provide a radar system whose output information is suceptible of easy and reliable telemetering back to the shooting aircraft or to remote scoring stations. It is, in fact, one of the objects of the invention to provide a system in which that telemetering is accomplished by the radar transmitter as an incident to its primary function of transmitting signals that can be returned as echoes.

These and other objects and advantages of the invention which will hereinafter appear are realized in part by the provision of a radar system which transmits a continuous signal which is phase modulated with a repetitive noise code. Returning echoes, if any, are compared in a detector which mixes the echo with the unmodulated radar signal. The output of the detector, generally a product detector, is passed through a filter, the output of which is applied to a correlator. There, the output signal is compared with a delayed replica of the noise code with which the radar signal was modulated.

The echo of interest is one that has been returned from a moving projectile. The projectile moves toward and than past the target and its radar set. Because of that, the echo signal is modified by the Doppler effect. The modification appears as a difference in frequency between the radar signal and the echo signal. The output of the first detector is the product of the unmodulated radar signal and the echo signal which includes the Doppler shift and the repetitive digital code signal which in the preferred arrangement is a pseudo-random noise. This product signal is passed through the high pass filter to the correlator. There are other even higher frequency terms in the first detector output, but they do not pass through the filter. In the correlator, the filter output signal is compared with a delayed version of the noise code. If the delay occasioned by the time required for the signal to travel to the projectile and return as an echo corresponds to the delay in the arrival at the second detector of the repetitive noise code of the correlator, then they will arrive at a time when the noise is synchronized. If there is correlation, there will be an output from the second detector. That output will include the Doppler information that was supplied to the correlator from the first detector. Doppler information will appear at the output of the correlator only when there was correlation between the pseudo-random noise component of the product signal from the first detector and the delayed pseudo-random noise that was furnished to the correlator. The velocity of electro-magnetic radiations is known. Therefore, the presence of a Doppler signal at the output of the correlator means that a projectile passed by the target at a distance which can be computed by multiplying the velocity of electro-magnetic waves by one-half of the duration of the delay in applying the pseudo-random noise to the correlator. The division by one-half assumes that the time required for the radar signal to travel from the radar set to the target is equal to the time required for the echo to return. By using a number of correlators and furnishing the same pseudo-random noise code to each of them, delayed in different degree, a range gate system is provided in which the identity of the correlator at which a Doppler signal appears is indicative of the distance to the target.

The Doppler signal has a frequency very much lower than the transmitted radar signal, and the period of the Doppler signal is greater by several times than the period at which the pseudo-random noise code is repeated. The output of the Doppler filter varies at the Doppler rate and has an amplitude proportional to the auto-correlation function. The Doppler filter is designed to pass only signals from projectiles which pass the target with a given relative velocity range.

The Doppler signal is used to modulate the radar signal generator by frequency modulating the oscillator or by phase modulating the oscillator output. That information can be fed to a separate telemetering antenna. However, it is not necessary to provide a separate antenna. The transmitting antenna can be made to serve as the telemetry antenna.

IN THE DRAWINGS

Figure 1:
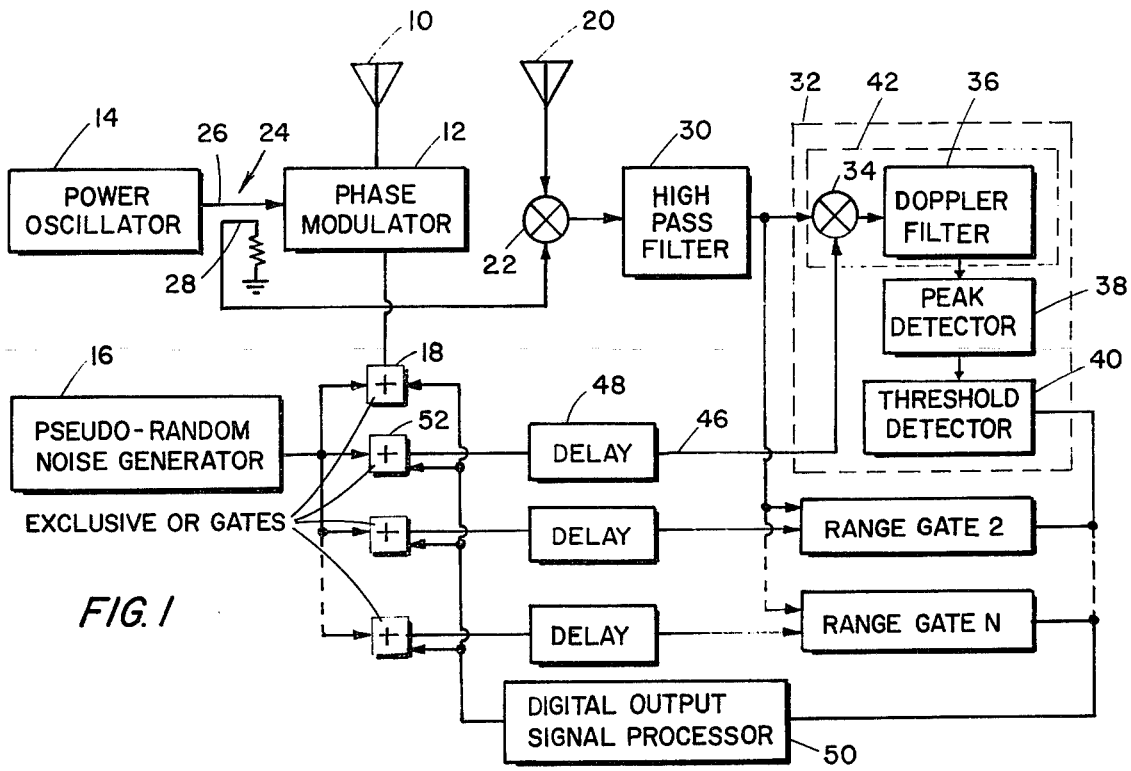
FIG. 1 is a schematic diagram of a system which embodies the invention.

In FIG. 1 the radar and telemetry transmitting antenna 10 is connected to the output of a phase modulator 12 which modulates signals supplied to it by the power oscillator 14. The modulating signal is a repetitive code supplied in digital form from the pseudo-random noise generator 16. A summer 18 is included in the circuit from the noise generator to the modulator. Information to be transmitted to a telemetry station is applied as a signal at the other input of the summer so that it, too, will appear as modulation on the radar signal output to antenna 10.

If the wave radiated from the antenna 10 strikes a reflective target, some of the energy will be reflected back as an echo toward the receiving antenna 20. If the echo received by antenna 20 has been reflected from a place that does not have movement relative to antenna 20, then the frequency of the reflected signal will be constant and can be recognized by that quality. On the other hand, if the energy arriving at antenna 20 has been reflected from a target that moves relative to antenna 20, then the returning signal will have undergone a frequency change called the Doppler effect.

The signal from antenna 20 is applied to a first mixer or product detector 22. The function of this detector is to multiply the signal arriving from antenna 20 with a sample of the signal derived from the power oscillator before modulation by the phase modulator 12. In FIG. 1, a directional coupler 24, represented here by placing a section of output line 28 close to the antenna line 26, samples the power oscillator output signal and applies the sample by line 28 to product detector 22. The sample is called the "local oscillator" signal.

The output, or first product signal, of the first product detector 22 includes an unmodulated component. That component is the result of imperfect phase modulation in modulator 12 and, in a system like the one shown in FIG. 2, it is the result of radiating the unphase modulated oscillator output directly to the receiving antenna. The unmodulated component in the first product signal is called "leakage component". It appears as a d.c. or very low frequency signal and its amplitude may be many times greater than that of the component of the first product signal which includes the miss-distance information. The leakage component may interfere with subsequent signal processing. To eliminate or reduce it, the first product signal is applied to a high pass filter 30.

The output of the high pass filter is applied to a range gate 32. That gate includes, in series and in order, a second product detector 34, a Doppler filter 36, a peak detector 38, and a threshold detector 40. The combination of the second detector 34 and the Doppler filter is called the correlator 42. A sample of the pseudo-random noise generator output is applied by line 46 to one input of detector 34. Line 46 includes a means 48 for delaying the code signal by some selected amount. The delayed sample of the code is mixed in the detector 34 with the output of high pass filter 30.

The output of the pseudo-random noise generator is a digital code which continues for some selected number of bits and then is repeated. It is repeated over and over. Both of the signals that are applied to the detector 34 include variations according to that code. The detector finds the product of those two signals. If the two codes arrive at the detector in unison, the output level will be high and will vary at the Doppler rate. If the code sequence does not arrive at the detector 34 inputs in synchronism, the magnitude of the detector output signal will be reduced.

Figure 3:
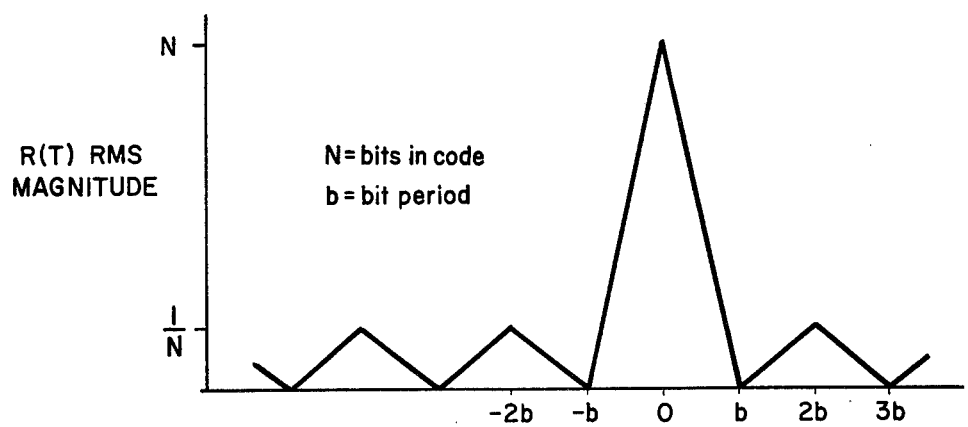
FIG. 3 is a diagram which describes the auto-correlation function.

FIG. 3 is a diagram of a representative auto-correlation function. The diagram will differ for different codes. It indicates in idealized fashion the relation between the output from the product detector 34 and the degree of correlation between the time of arrival at the detector 34 of the echo and the code sample.

Output level is plotted on the ordinate; degree of correlation is plotted on the abscissa. Zero represents that the signals are synchronized. The unit $b$ represents one bit of the code. Point $b$, and point minus $b$, represents an out of synchronism condition by one bit. The relative amplitude of the several lobes on each side of correlation depends upon what code is used. FIG. 3 assumes that all side lobes have the same amplitude. In any event, the RMS level in the side lobes is one over N so that the signal at correlation is easily identified. The output level drops to zero at $-b$ and at $+b$. That is important because it means that the gate width is two bits wide in time. If, instead of arriving in synchronism, the signal arriving at one input of the detector was advanced in time by one bit, then the output of the detector would have fallen to zero as indicated at point $b$ on the abscissa in FIG. 3. Conversely, if the signal arriving at that other input of the detector is delayed in time by one bit, the output of the mixer will have fallen to zero as indicated at point $-b$ on the abscissa in FIG. 3.

Thus it is that the output of the mixer 34 provides an indication of whether or not the codes delivered to the mixer by high pass filter 30 and delay unit 48 are in unison. If they are in unison, the conclusion can be drawn that the time required for the radar signal emanating from the antenna 10 to traverse the distance to a target and return to antenna 20 is equal to the delay time in delay unit 48. Since only half of the total transit time was required for the echo to return from the target to antenna 20, the distance to the target can be computed by multiplying one half of the time delay in unit 48 expressed in seconds times 300,000,000 meters per second which is the speed at which electro-magnetic radiations travel in air. The product of that computation is given in meters distance from antenna 20 to the passing projectile. In practice, the computation must take into account the delay in the antenna cable and other elements of the system.

The output of detector 34 is called the second product signal. It includes a low frequency component at the Doppler frequency and the magnitude of that component varies in accordance with the auto-correlation function. That is, if the code sequences arriving at detector 34 are in unison, the Doppler signal will have high amplitude. Conversely, if the code sequences arriving at detector 34 are a bit or more out of phase, then the amplitude of the Doppler component will be low. The correlator includes a Doppler filter 36 which rejects all but the Doppler signal. The presence of a Doppler signal in a degree great enough to constitute an indication that an echo from a moving target was returned to antenna 20 is determined in the combination of peak detector 38 and threshhold detector 40. If the Doppler output reaches the required amplitude over the required period of time, a signal will appear at the output of the range gate 32. The fact that there is a signal at that output means that a projectile did pass the target at a distance corresponding to the delay in unit 48. That information is applied to a signal processor 50. The signal processor developes a digital signal which indicates that an output signal appeared at the output of the range gate. The output of the signal processor is applied to one of the inputs of the summer 18. Summer 18, and the others, is an exclusive OR gate. Its function is to invert or not invert the phase of the code signal that is applied to the phase modulator and to the correlator or correlators. It performs its function in response to signals from processor 50. Inversion of the code signal has no effect on the miss-distance determination function because the phase of the transmitted code and the comparison sample are both inverted simultaneously. However, the radiated signal is modulated with intelligence from the range gate and that intelligence can be recognized at the telemetry receiving station.

The range gate 32 is capable of detecting the presence of a target only at a given small range of distances. To detect the presence of targets at other distances, other range gates are employed. The several range gates are similar to gate 32. Each is supplied with a portion of the output of the high pass filter 30, and each is supplied with a sample of the code generated in the pseudo-random noise generator 16. The several range gates differ only in that the delay in application of the repetitive code is different in the case of each range gate. The use of the range gating technique is old in the miss-distance indicator art so that expansion on that phase of the operation is unnecessary.

With that general description, it is possible to understand operation of the system in more quantitive terms. The distance sensor makes use of pulse compression techniques to achieve a performance that is superior to that attainable with simple pulse Doppler radar systems which operate with a similar peak transmitter power. The sensitivity of this system is far greater and it does not suffer from second-time-around echoes which is an inherent problem in simple pulse Doppler units. This system includes means for exercising precise digital control of the range gate position by modifying the delay time of the pulse code sample that is furnished to the one or more range gates. The range of the gate can be altered as desired. That feature is compatable with various search and acquisition schemes. Little has been said to this point about the form of the pseudo-random noise code, except that it is repetitive. In preferred form, the code is one which either inverts the sign wave output of the oscillator or allows that output to pass undisturbed depending upon the status of the digital bit which is present at the control port of the phase modulator. It is possible to use other degrees of phase shift. The most convenient and the preferred arrangement is to use either a 180 degree shift, or none at all.

In the receiver, target echo is first mixed with a sample of an unmodulated signal from the oscillator. Neglecting spill over, the output of the first mixer is the modulating digital signal delayed by the total propagation time from the modulator to the target and back to the receiver mixer. This delayed digital code is modified by the relative motion between the target and the platform on which the receiver is mounted, if the local oscillator signal is described as $A \cos W o t$.

Let $T$ = total ring around propogation time to the target and back.

Let $\phi$ = phase of the transmitted signal which is either zero degrees or 180 degrees.

If the difference frequency product from the first mixer is designated $V(t)$, then:

$$V(t) = A \cos wot \cdot A \cos [Wo(t-T) + \phi(t-T)] +$$
high frequency terms which are neglected.

Simplifying: $V(t) = \cos[WoT - \phi(t-T)] = \cos WoT$ [if $\phi(t-T) = 0°$] $= -\cos WoT$ [if $\phi(t-T) = 180°$]

If a logical one corresponds to plus one unit of voltage and a logical zero corresponds to minus one unit of voltage, then the output of the mixer is nothing more than the delayed code multiplied by $\cos WoT$. If the symbol $M(t)$ is defined as the digital modulating code time sequence at time $t$, then one can write:

$$V(t) = M(t-T) \cos WoT.$$

This is the signal that is provided to the correlator input where it is correlated with another delayed version of the original modulating signal and passed on to a Doppler filter. The Doppler filter is one that will pass signals of Doppler frequency. The digital code sequence is selected so that the complete code is transmitted at least twice for each cycle of the Doppler signal. The Doppler filter will provide the integration necessary for the correlation process. If the term $M(t-T_1)$ represents the reference signal applied by line 46 to the correlator, then the correlator mixer output can be described as follows:

Correlator mixer output equals $$M(t-T_1) M(t-T) \cos WoT.$$

If the auto-correlation function of the digital code is described by the symbol R(10), then the low frequency component of the correlator mixer output signal can be represented by the expression:

$$\text{Output} = R(T - T_1) \cos WoT.$$

Thus it is seen that the signal passed by the Doppler filter varies at the Doppler rate and has an amplitude proportional to the auto-correlation function. The Doppler filter is designed so that it discriminates and will pass only Doppler frequencies such that the sensor output will be influenced only by projectiles whose relative velocity is within some selected range. The fact that the amplitude of the Doppler signal is proportioned to the auto-correlation function of the code allows for range gating.

As explained above, if there are N bits, each bit of width $b$, in a linear pseudo-random noise code, then the auto-correlation function varies as shown in FIG. 3. FIG. 3 is idealized. In practice, the central peak is two bits wide. Therefore, the "width" of the range gate is given by the expression "gate width equals $b$ times the speed of light". The width is given in range of distances at which the projectile must be to return an echo which will result in a signal output from the gate.

Isolation between gates is given by the expression:

Maximum Isolation = $20 \log_{10} N$ dB (Ideal for a code in which all side lobes have uniform peak amplitude.)

For example:

If N = 1000 bits and b = 10 nanoseconds, then the isolation between gates is 60 dB and the gate width is 10 feet. The actual range at which the gate is centered is determined by the amount of time the correlator's reference signal is delayed relative to the modulating signal. When the total two way propogation time equals this delay, a peak response is achieved by the sensor. This delay is easily obtained digitally within the pseudo-random noise generator and can be varied by digital command supplied to the pseudo-random noise generator assembly if desired. The isolation will typically be less than the maximum isolation, but with proper code selection, the maximum isolation can be approached by all gates. Furthermore, low isolation side lobes of the correlation function can be positioned where desired by proper code selection.

The preceding analysis was based upon the assumption that the oscillator siganl would be perfectly phase modulated. In practice, of course, the phase modulator has both amplitude and phase distortion. These distortions can be represented by a perfect phase modulator with the leakage past it. The leakage term will appear as a DC component at the output of the receiver mixer. If echoes are received from vibrating surfaces such as air foils and the like, then this leakage term will be modulated, thus providing a corresponding Doppler signal at the receiver mixer output. This signal can be troublesome in the following receiver circuitry. It appears as a reduced isolation between gates. A high pass filter is incorporated between the first mixer and the correlator to attenuate this signal. The cut-off frequency of the high pass filter must be chosen to be as high as possible without significantly differentiating the recovered digital code.

All radar systems whose information band width is small compared with the transmitted signal band width must have a loop sensitivity determined by the average transmitted power, receiver noise figures, and noise band width. In either a CW radar or a pulse radar, the information band width and the noise band width of the receiver are essentially twice the maximum Doppler frequency. Also, the receiver noise figures can be made the same. The essential difference lies in the fact that the duty cycle of a pulse radar limits the average transmitted power to a small fraction of the peak pulse power whereas a CW radar utilizes 100 percent of the available transmitter power. Since both receiver sensitivity expressed in terms of average power are identical, the CW radar loop sensitivity can be far greater than a simple pulse radar system. Typically, most miss-distance indicator radars operate with a duty cycle of less than one percent, a CW radar having the same peak transmitter power will thus have 20 dB more loop sensitivity than the other types of pulse radars. Since the use of solid state devices severely limits the available peak power, a CW approach is very advantageous.

The range at which second-time-around echoes can create ambiguities is determined by the time length of the digital code.

If code length = T seconds, and
C = speed of light,
second-time-around range = T/2C.

Figure 2:
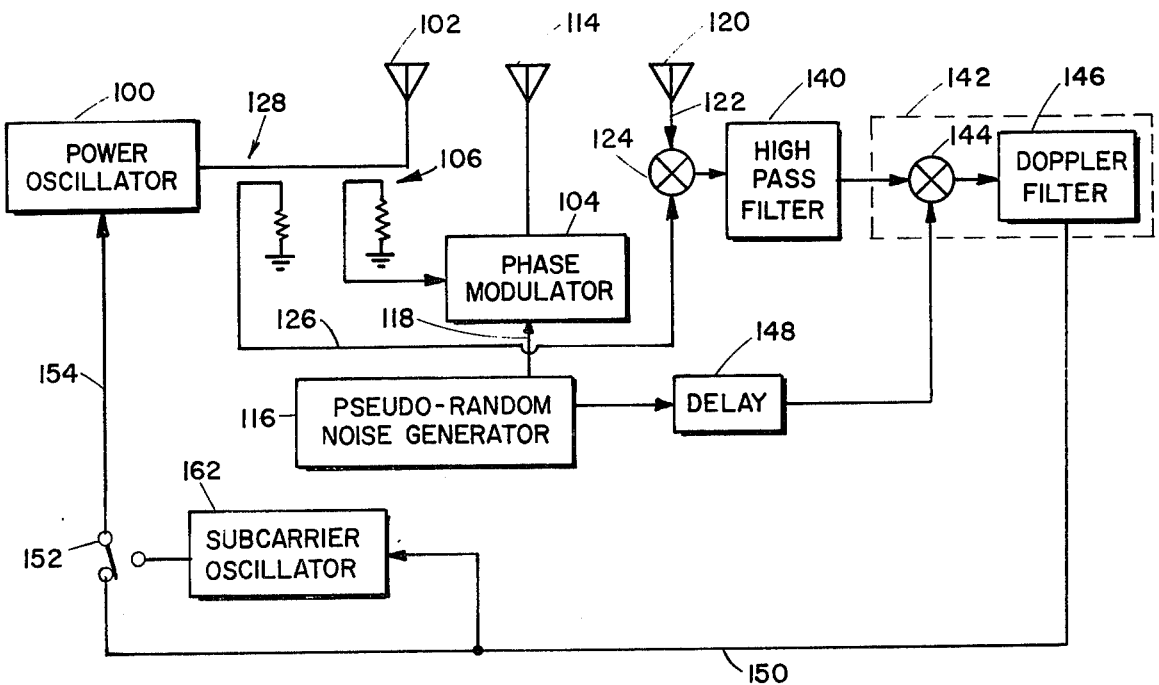
FIG. 2 is a schematic diagram of an alternative embodiment of the invention.

Two modes by which the system may be used for self telemetering are illustrated in the drawings. In the case of each of them, the high average power provided by the CW sensor enhances the telemetry signal in the same way that it improves the overall sensitivity. The operation of FIG. 1 has already been described. FIG. 2 differs from FIG. 1 seen in the arrangement for telemetering information from the radar sensor to a telemetry station. The system of FIG. 2 employs a power oscillator 100 whose output is applied to a telemetry antenna 102. A sample of that signal is applied to a phase modulator 104 through a directional coupler 106. The output of the phase modulator is applied to the radar transmitting antenna 114. The modulation signal is a repetitive digital code which is generated in the pseudo-random noise generator 116 and is applied to the modulator by line 118.

Echo signals are returned to the receiving antenna 120 and are delivered from the antenna by line 122 to one input of a product detector 124. A sample of the output of power oscillator 100 is supplied to the local oscillator input of the product detector by a line 126. The sample is derived in a directional coupler 128.

As in the case of the circuit of FIG. 1, the output of the product detector is passed through a high pass filter to the range gate. The high pass filter is identified by the reference numeral 140 and the range gate is identified by the reference numeral 142. That range gate includes a second product detector 144 and a Doppler filter 146. In this case, the output of the Doppler filter is not converted to digital form prior to being telemetered to a telemetry station. The peak detector and the threshhold detector of the range gate in FIG. 1 are not needed here and have been omitted.

The output of high pass filter 140 is applied to one input circuit of the product detector 144. A sample of the pseudo-random noise generator output, that is, a sample of the repetitive code, is applied through a delay unit 148 to the other input of the product detector 144. The receiver operates in the manner described in connection with FIG. 1 with the exception that the peak detector and the threshhold detector are omitted, and with the further esception that the exclusive OR gate adders have been omitted.

In the case of FIG. 2, the output of the Doppler filter is applied by line 150, switch 152, and line 154 directly to the power oscillator. The output of the Doppler filter is a signal at Doppler frequency whose amplitude is increased when the noise code auto-correlation function is high. The Doppler signal is used to vary the frequency generated in the power oscillator. As a consequence, the signal supplied to the telemetry antenna includes current miss-distance information. The rate of frequency shift of the Doppler signal is a function of the distance at which the missile passes the receiving antenna. Consequently, the miss-distance information can be reconstructed at the telemetry receiver without any need for synchronization between the receiver and the radar set. The telemetry spill over signal that is received by the radar receiver is attenuated by the high pass filter and the correlator so that the requirement for isolation of the antennaes is reduced.

If there is a high amplitude reflection from a target within the range gate, instability may result from telemetry feedback. To prevent that, the output of the Doppler filter can be used to frequency modulate a sub-carrier oscillator. If the switch 152 is thrown to its upper position in FIG. 2, then the telemetry circuit is traced from the output of the Doppler filter to the sub-carrier oscillator 162 and from the output of the sub-carrier oscillator through switch 152 and line 154 to the power oscillator 100. The sub-carrier oscillator merely places the cross talk telemetry signal at a frequency sufficiently above the Doppler frequency filter cut-off so as to greatly attenuate it and thus stabilize the sensor against a possible feedback oscillator.

It was described above that the function of the high pass filter following the first detector was to filter out d.c. and low frequency signals. It was described that the d.c. component resulted from mixing leakage signal with echoes from the target which does not move relative to the receiving antenna. But parts of the target may vibrate and introduce a Doppler component in the echo. That component mixed with leakage signal results in a low frequency output. That low frequency component is harder to eliminate than the d.c. component, and it is primarily because of that low frequency component that the high pass filter is included. If the invention is used in a way that minimizes leakage or vibration, or any other way that reduces the low frequency and d.c. components, then the first detector and filter may be eliminated.

Figure 4:
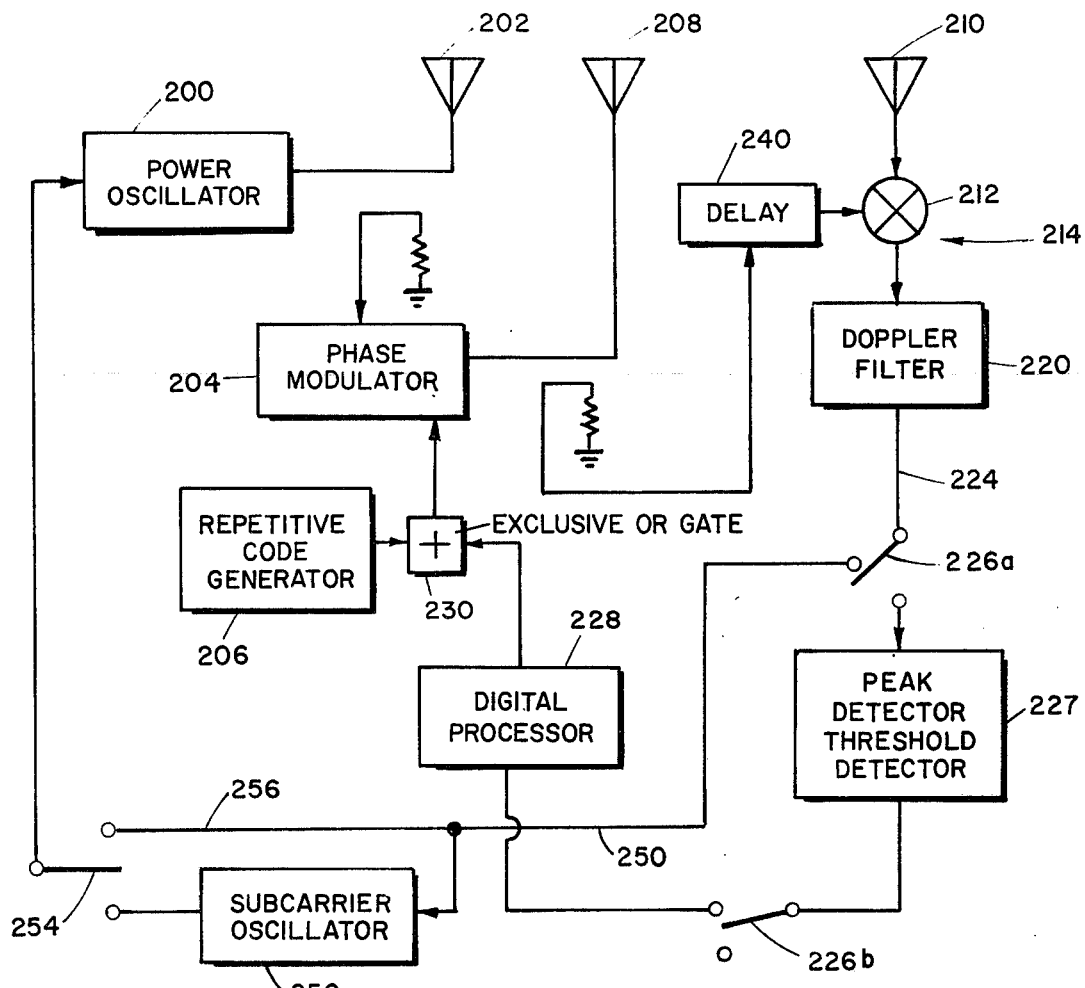
FIG. 4 is a schematic diagram of another embodiment of the invention.

That has been done in the system of FIG. 4 where power oscillator 200 output is supplied both to telemetry antenna 202 and to phase modulator 204 where the oscillator signal is modulated by the code generated in generator 206 and then fed to radar transmitting antenna 208. Echoes received at receiving antenna 210 are supplied to the product detector 212 of range gate 214. For the sake of uniformity product detector 212 is referred to as a "second detector" and its output is called "second product signal".

The second product signal from detector 212 is applied to a Doppler filter 220 and the second product signal from detector 216 is applied to a Doppler filter 222.

The second detector in this FIG. 4 performs the same function as do the second detectors of FIGS. 1 and 2. The output signals are applied to a telemetry line 224. If switch 226 connects line 224 through peak detector and threshhold detector 227 to signal processor 228, digital signals corresponding to miss-distance output information from gate 214 are applied to exclusive or gate 230. Those signals invert the code at the output of generator 206 as described in connection with FIG. 1. The code signal, either inverted or not, is applied through delay unit 240 to the local signal input of second product detectors 212.

When switch 226 connects the digital processor to line 224, telemetry is accomplished as described in connection with FIG. 1. If the switch 226 connects line 224 to line 250, the output signal from the gates modulates the power oscillator 200 directly or through subcarrier oscillator 252, depending upon whether switch 254 connects line 256 or oscillator 252 to the oscillator.

Although I have shown and described certain specific embodiments of my invention, I am fully aware that many modifications thereof are possible. My invention therefore, is not to be restricted except insofar as is necessitated by the prior art.

I claim:
1. The method of measuring distance to a first object which is moving relative to a second object, which includes the steps of:
   transmitting a radar signal from the second object toward the first object, the radar signal comprising a continuous carrier phase modulated by a repetitive digital code;
   simultaneously receiving echoes of said radar signal returning to said second object from said first object;
   multiplying said echo by a delayed sample of said digital code to device a signal corresponding to their product which includes a Doppler component; and
   developing and transmitting a telemetry signal by modulating said carrier as a function of the amplitude of said Doppler component.

2. The invention defined in claim 1 in which said carrier signal is modulated as a function of said Doppler component by utilizing said component to reverse the phase of said digital code prior to phase modulation of said carrier and prior to multiplication of said code by an echo.

3. The method of measuring distance to a first object which is moving relative to a second, said method comprising the steps of:
   transmitting a radar signal from the second object toward the first object, the radar signal comprising a phase modulated carrier the modulation of which represents a repetitive digital code;
   simultaneously receiving echoes of said radar signal returning from the first object to the second object;
   multiplying the received echo by a sample of said carrier to derive a product signal;
   multiplying the product signal by said repetitive digital code to derive a second product signal;
   separating out the low frequency component of said second product signal to develop an output signal; and
   developing and transmitting a telemetry signal by modulating said radar signal as a function of said output signal.

4. The invention defined in claim 3 in which said product signal is divided into a plurality of like product signals;
   multiplying each of said like product signals by a respectively associated repetitive code signal each of which constitutes a replica of said repetitive digital code delayed in a degree which differs in the case of each of said like product signals to develop a plurality of second product signals each associated with a respective one of said plurality of said like product signals; and
   separating out the low frequency component of each of said plurality of second product signals to develop a plurality of output signals each corresponding to a respectively associated one of said plurality product signals.

5. The method of measuring distance between first and second relatively moving objects which comprises the steps of transmitting from the second object toward the first object a signal comprising a phase modulated carrier the modulation of which represents a repetitive digital code;
   simultaneously applying a sample of the carrier to a detector capable of multiplying said sample and echoes of said signal returned from said first object to said second object;
   receiving and applying to said detector echoes of said signal returned to said second object from said first object;
   developing a plurality of correlation signals each constituting a delayed replica of said repetitive digital code;
   multiplying each of said correlation signals by signals corresponding to said product signals to derive, on the occasion of the return of an echo, a second product signal;

separating out the low frequency components of said second product signals to develop output signal corresponding to said second output signals, respectively; and modulating said carrier with each of said output signals whereby said signal includes information about the presence of echoes at said second object and the time required for said signal to traverse the distance from said second object to said first object and to return to said second object as an echo.

6. In combination:
an oscillator;
a phase modulator;
a transmitting antenna;
a receiving antenna;
a first detector;
a high pass filter;
a correlator comprising a second detector and a Doppler filter in the output circuit of said second detector;
a repetitive digital code generator;
means for applying the output of said oscillator and the output of said code generator to said phase modulator;
means for applying the output of said phase modulator to said transmitting antenna;
means for applying echoes of signals transmitted by said transmitting antenna and a portion of the output of said oscillator to said first detector;
means for applying the output of said first detector to said high pass filter;
means for applying the output of said high pass filter and a portion of the output of said code generator to the detector of said correlator;
means for detecting the output of said Doppler filter of said correlator; and
means for modulating the output of said phase modulator as a function of the output of said Doppler filter to provide a telemetry signal.

7. The invention defined in claim 6 which comprises a plurality of correlators and means for supplying to each of said correlators a portion of the output of the code generator; and
means for delaying, in a degree which differs in the case of each correlator, the arrival of said portion of the output of said code generator at said correlator.

8. In combination:
an oscillator;
a phase modulator;
a transmitting antenna;
a receiving antenna;
a product detector;
a Doppler filter;
a repetitive digital code generator;
means for applying the output of said oscillator and the code from said generator to said phase modulator;
means for applying the output of said phase modulator to the transmitting antenna;
means for applying echoes of signals transmitted by said transmitting antenna and a delayed sample of said code to said product detector;
means for applying the output of said detector to said Doppler filter; and
telemetering means for modulating the output of said oscillator as a function of the output of said Doppler filter.

9. The invention defined in claim 8 in which said telemetering means comprises means for inverting, as a function of Doppler filter output, the phase of the code applied to said phase modulator and said detector.

* * * * *